United States Patent
Geris et al.

(10) Patent No.: US 8,384,823 B2
(45) Date of Patent: *Feb. 26, 2013

(54) METHOD AND APPARATUS FOR MAXIMIZING THE SUSTAINABLE FLASH OF A HANDHELD PORTABLE ELECTRONIC DEVICE

(75) Inventors: Ryan Alexander Geris, Kitchener (CA); Lyall Kenneth Winger, Waterloo (CA); Christopher Simon Book, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/251,740

(22) Filed: Oct. 3, 2011

(65) Prior Publication Data

US 2012/0026389 A1 Feb. 2, 2012

Related U.S. Application Data

(63) Continuation of application No. 12/837,881, filed on Jul. 16, 2010, now Pat. No. 8,059,192, which is a continuation of application No. 11/863,718, filed on Sep. 28, 2007, now Pat. No. 7,777,809.

(51) Int. Cl.
*H04N 5/235* (2006.01)
*H05B 37/00* (2006.01)

(52) U.S. Cl. ............... 348/372; 348/371; 315/200 A; 315/241 P; 396/301; 396/205

(58) Field of Classification Search ......... 348/370–372; 396/155–206, 277–279, 301–304
See application file for complete search history.

(56) References Cited

U.S. PATENT DOCUMENTS

| | | | |
|---|---|---|---|
| 5,352,968 A | | 10/1994 | Reni et al. |
| 6,233,016 B1 * | | 5/2001 | Anderson et al. ............. 348/372 |
| 7,616,882 B2 * | | 11/2009 | Guthrie et al. ................ 396/205 |
| 7,777,809 B2 * | | 8/2010 | Geris et al. ..................... 348/372 |
| 8,059,192 B2 * | | 11/2011 | Geris et al. ..................... 348/372 |
| 2002/0075397 A1 | | 6/2002 | Hanada et al. |
| 2004/0012712 A1 | | 1/2004 | Kawakami |
| 2004/0095096 A1 | | 5/2004 | Melton et al. |
| 2005/0265709 A1 | | 12/2005 | Kim |
| 2008/0164847 A1 * | | 7/2008 | Drader et al. ................ 320/136 |

FOREIGN PATENT DOCUMENTS

| | | |
|---|---|---|
| EP | 1276308 A2 | 1/2003 |
| EP | 1476820 A | 3/2003 |
| JP | 2003032331 | 1/2003 |

OTHER PUBLICATIONS

U.S. Appl. No. 12/837,881, Notice of Allowance dated Aug. 5, 2011.

* cited by examiner

*Primary Examiner* — Chieh M Fan
*Assistant Examiner* — Dwight C Tejano
(74) *Attorney, Agent, or Firm* — Louis B. Allard; Borden Ladner Gervais LLP

(57) ABSTRACT

A method and apparatus for maintaining a maximum sustained flash current over the whole length of a flash using a programmable current drive in a handheld portable device powered by a battery. The method involves measuring the battery voltage before and after a flash is initiated and calculating the equivalent series resistance (ESR) of the battery. The calculated ESR is then used to adjust the flash current. The process may be repeated to correct for errors in the flash current.

18 Claims, 5 Drawing Sheets

METHOD AND APPARATUS FOR MAXIMIZING THE SUSTAINABLE FLASH OF A HANDHELD PORTABLE ELECTRONIC DEVICE

CROSS-REFERENCE TO RELATED APPLICATIONS

This application is a continuation of U.S. Ser. No. 12/837,881 filed Jul. 16, 2010, which is a continuation of U.S. application Ser. No. 11/863,718 filed Sep. 28, 2007, the disclosure of which is expressly incorporated herein by reference in its entirety.

BACKGROUND

1. Field

This method and device relate generally to handheld electronic devices having a camera LED flash and more particularly, to such devices that employ a battery to power the LED flash in addition to other functions performed by the handheld electronic device.

2. Background

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are small and battery powered. While some handheld electronic devices include a wireless communication capability, other handheld electronic devices are standalone devices that do not communicate with other devices.

The capabilities of these handheld electronic devices continue to expand. For example, a camera capability has been added to many mobile phones and is likely to expand to other such handheld electronic devices. More recently, an LED camera flash capability has been added to a number of mobile phones that, along with the other mobile phone capabilities, is powered by a single lithium ion battery. The current drawn from operating an LED (light emitting diode) camera flash is enormous and can easily brown out the system under certain conditions. Brown out is also known as battery droop and means that the battery voltage drops to a level that can impair the operation of other system functions, possibly even causing the system to reset. A lithium ion battery's ability to maintain its voltage is dependent upon such factors as the age of the battery and temperature; i.e., the equivalent series of resistance (ESR) of the battery varies with these parameters. There are also other system loads, such as GSM (global system for mobile communications) transmits and WIFI TX or RX, that will affect the level at which the system browns out or resets completely. WIFI and GSM are mentioned herein as examples of communication regimes that may be employed by the handheld electronic device that will place a load on the system and are not intended to be limiting. For example, the device could alternatively employ CDMA (Code-Division Multiple Access) or UMTS (Universal Mobile Telecommunications System).

Since most of the factors that affect brown out are not generally known to the user at the time of system operation, e.g., age of the battery, current temperature, size of the system load and flash load, the worst case voltage drop must be assumed when a decision is made whether to activate the flash, if brown out is to be avoided. Assuming the worst case severely limits the usefulness of the flash; i.e., the flash won't trigger sometimes, even though the system could probably sustain a flash pulse. Therefore, a method and apparatus is desired that can more accurately estimate the maximum flash current that is sustainable without having to use worst case assumptions.

BRIEF DESCRIPTION OF THE DRAWINGS

A further understanding of the method and device disclosed herein can be gained from the following description of the preferred embodiments when read in conjunction with the accompanying drawings in which.

DESCRIPTION OF THE PREFERRED EMBODIMENT

Figure 1:
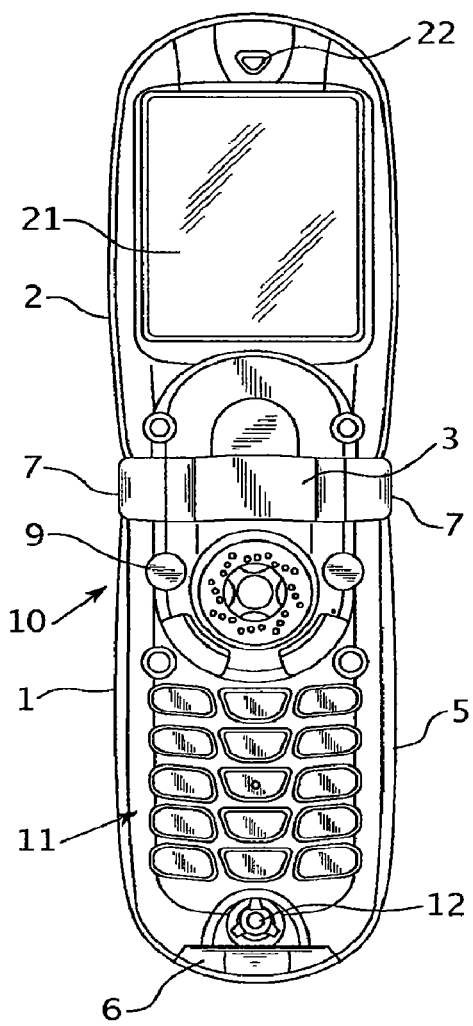
FIG. 1 is an elevational view of a foldable cell phone in the open position, viewed from the keypad side, for which the present concept may be applied.
Figure 2:
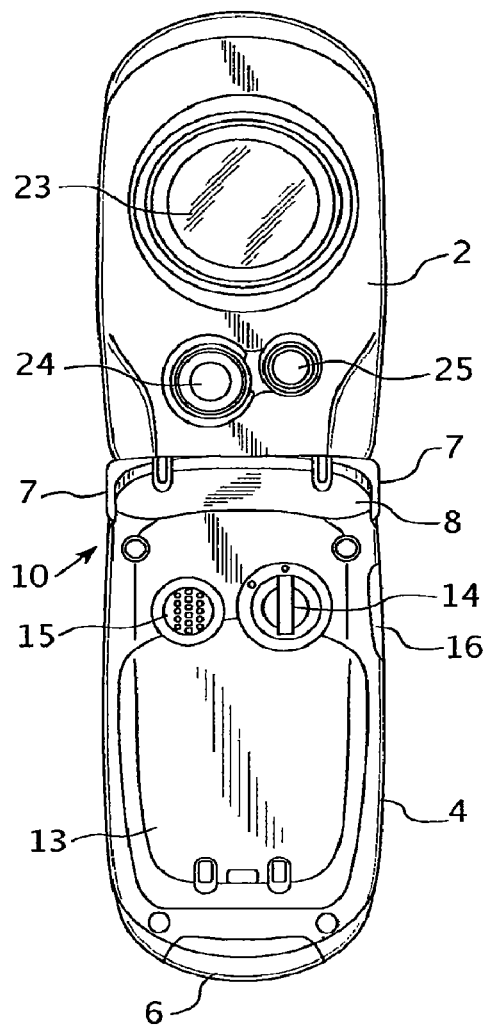
FIG. 2 is a elevational view of the open cell phone of FIG. 1, viewed from the reverse side.

The method described herein for maintaining a maximum sustainable flash current over the whole length of an LED flash using a programmable current drive can be applied to any handheld portable electronic device having an LED flash, usually in connection with a camera. For convenience, the method of both embodiments will be described as applied to a flash 25 of the cellular phone 10 illustrated in FIGS. 1, 2, and 6. FIG. 1 shows an elevational view of the cellular phone 10 in the open position with the keypad in the operation section 11 and the main display screen 21 exposed. FIG. 2 is an elevational view of the reverse side of the open flip phone 10 shown in FIG. 1. The cellular phone 10 has a lower housing 1 comprising an operation section 11 having standard numerical and alphabetic keys and microphone 12 on the front side illustrated in FIG. 1 and a battery 13, a battery lock knob 14, a speaker 15 and an earphone cover 16 on the reverse side of the lower housing 1. An upper housing 2 comprises a main display section 21 and a receiver 22 on the front side and a subdisplay section 23, a camera lens section 24 and an LED flash section 25 on the reverse side of the upper housing 2. The cellular phone 10 further includes a hinge 3, a lower cover 4, an electrical connector cover 6, a hinge cover 7, an antenna cover 8 and a subdisplay 23 perimeter frame.

Figure 6:
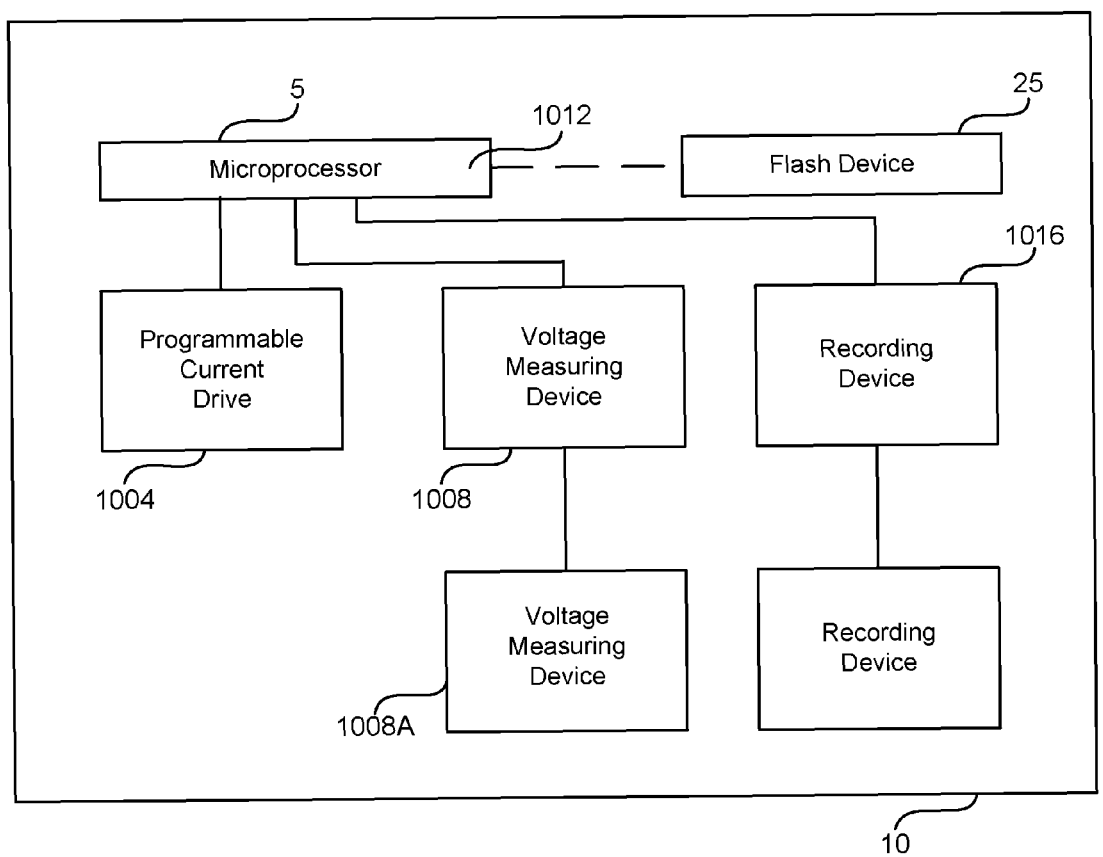
FIG. 6 is a block diagram depicting certain portions of the cell phone.

In accordance with this embodiment, when the user presses the camera shutter button 9 under low light conditions, a flash of the LED 25 is triggered and the system will use initial measurements of the effect of a given flash current on the battery to predict the maximum sustainable flash current over the whole length of the flash cycle. Since the equivalent series resistance of the battery increases with time, a programmable current drive is part of a microprocessor 5 contained within the lower housing 1. As is depicted in FIG. 6, the programmable current drive could be a separate component 1004 under the control of the microprocessor 5. To predict the maximum sustainable flash current over the length of the flash cycle, the voltage across the battery is first measured under normal system load. Such voltage measurement could be performed by the microprocessor 5 or, as is depicted in FIG. 6, by a voltage measuring device 1008 that would be a separate component under the control of the microprocessor 5.

Normal system load means that WIFI TX/RX or GSM (Global System for Mobile Communications), whether active or not active, must be taken into account as part of the normal system load when measuring the voltage across the battery (Vbat) at this step in the process. The flash current is lower or turned off during a radio occurrence such as GSM or WIFI. If there is a radio occurrence during the pre-flash VBAT measurement, the system repeats the measurement until the value of a VBAT level is determined in the absence of a radio occurrence. The LED flash 25 is then initiated at a pre-selected current, e.g., 500 mA. The voltage across the battery is then measured with the flash plus system load, again taking into account WIFI TX/RX or GSM, whether active or not active. Such voltage measurement could be performed by the microprocessor 5 or, as is depicted in FIG. 6, by the voltage measuring device 1008 under the control of the microprocessor 5 or by another voltage measuring device 1008A under the control of the microprocessor 5. It is understood that the voltage measuring devices 1008 and 1008A could be individual devices or could be a single device that performs multiple functions without limitation. The flash current at the battery is then calculated from the foregoing values and the Vf tables that are obtained from the battery vendor, and a worst-case flash driver efficiency is assumed. Vf is the maximum forward voltage of the flash LED at specific currents. The Vf table is supplied by the LED vendor. Then the equivalent series resistance (ESR) across the battery is calculated from the above data. Since actual measured parameters are used for this calculation, the temperature data and age of the battery do not need to be known. Next, the equivalent series resistance of the battery is calculated at a time 500 ms later from known ESR characteristics that are provided from measurements made by the handheld electronic device vendor. A new flash current is then calculated and the result implemented within approximately less than 3 ms of the start of the flash event. The above measurements/calculations should be repeated, to verify the accuracy of the calculations. Alternatively, the system can keep sampling the battery voltage every 3 ms throughout the flash duration to ensure that the battery droop due to changes in the ESR follows the predicted path and does not reset the device.

Figure 3:
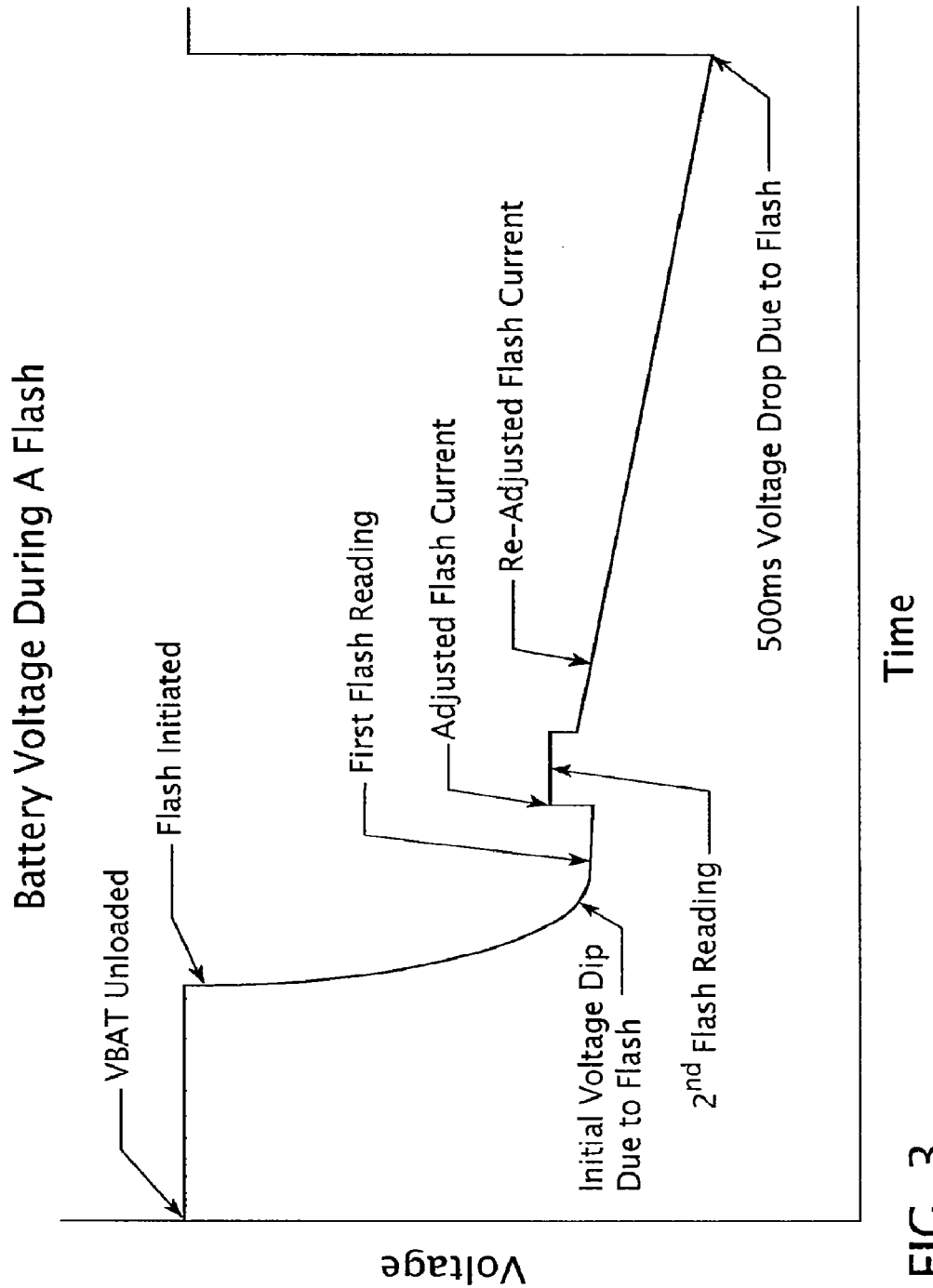
FIG. 3 is a graphical representation of the voltage droop during a 500 ms flash cycle.

The battery voltage during a flash event employing the method of the foregoing embodiment is graphically illustrated in FIG. 3 with the timing of the steps of the method of this embodiment summarily identified. It should be noted that the x and y axis in FIG. 3 are not drawn to scale.

Performing a pre-flash Vbat measurement and measuring the voltage that the battery drops down to takes into account both the temperature and battery ESR variables at the time of taking a picture with the flash. When a wireless local-area network (WLAN) is present on a device, the software that implements the steps of this embodiment needs to identify if a WLAN pulse occurred during a pre-flash measurement of Vbat. (It should be appreciated that WLAN and WIFI are used herein interchangeably.) By ORing the LNA_EN and WLAN_PA_EN, the software can determine that a WLAN was on during a flash LNA_EN and WLAN_PA are system signals that are OR-ed together and connected to a GPIO (General-Purpose Input/Output on the processor).

Figure 4:
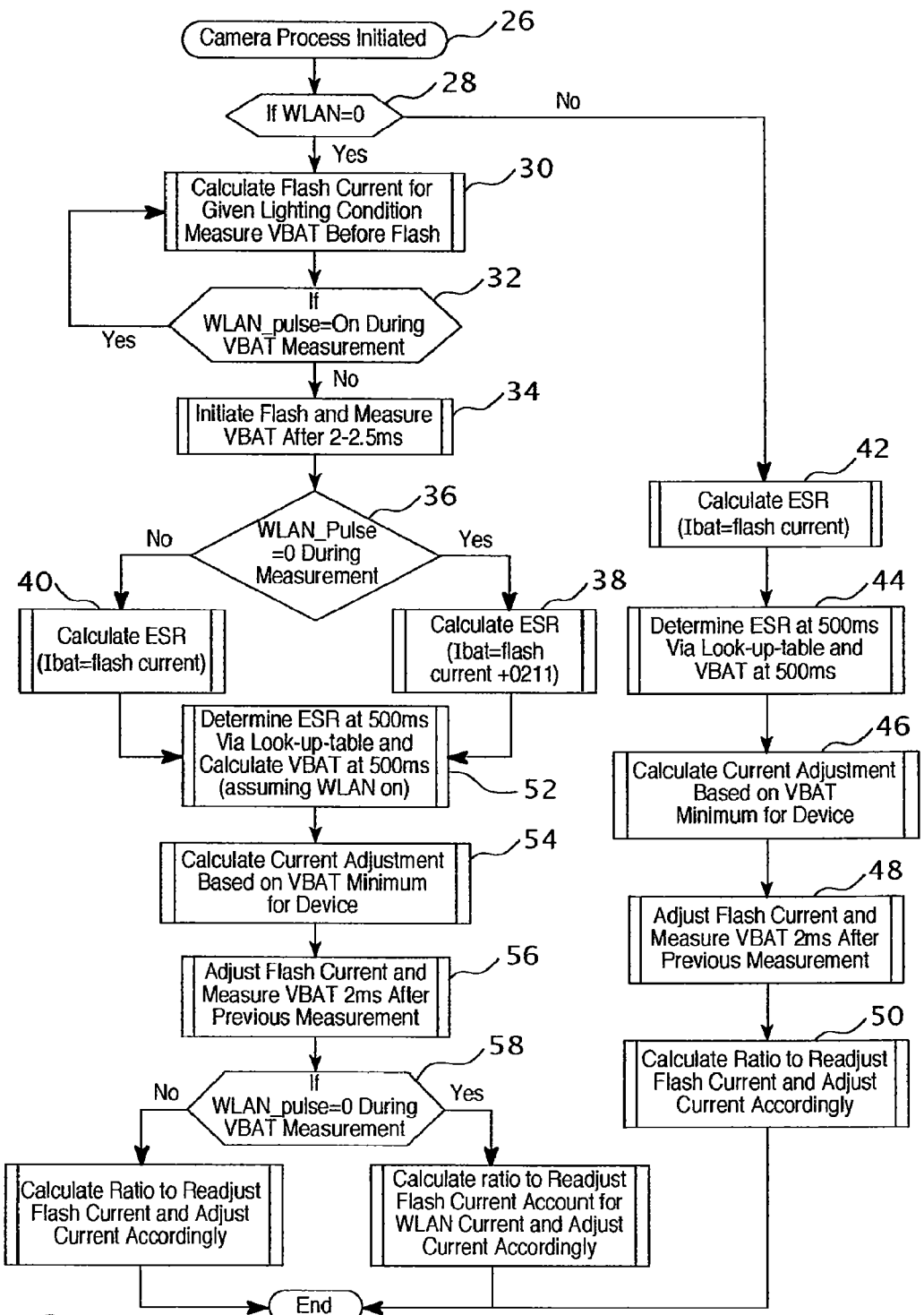
FIG. 4 is a logic flow diagram illustrating the steps of the method of the parent application.

Knowing the foregoing information, the software in the microprocessor 5 that carries out the logical steps noted in FIG. 4 can reduce the camera flash current to the optimal point for a given battery and temperature to allow the system to run without hanging up the device. In general, the optimal flash current is determined by:

1. Calculating the flash current needed for a given light condition.

2. Initiating the LED flash, immediately reading the battery voltage for longer than 1 ms and taking the minimum value so read, to ignore readings that occur during a WLAN pulse, but not longer than 3 ms, and adjusting the flash current based on the calculations defined below.

3. Take a second pre-flash reading, i.e., at 4 ms into the initiation of a flash current and readjust the flash current based on the calculations defined below. The term "pre-flash" refers to the interval commencing at the time the flash current is initiated by activation of the button 9 in the operational section 11 of the cellular phone 10 and extending to a time just prior to the actual initiation of the flash of the LED 25.

The system monitors Vsys, the system voltage that provides power to the device. If Vsys is less than Vmin (a pre-selected setpoint) the device is automatically shut down. To avoid accidental shut downs, the system waits 3 ms after Vsys has gone below Vmin. At that point, if Vsys<Vmin is still true, the system is shut down. That is why in Step 2 above, the system needs to measure the pre-flash Vbat in less than 3 ms.

A more detailed explanation of the steps of the method of the embodiment first disclosed in the parent application is shown in the flow chart illustrated in FIG. 4. First, the camera process is initiated at step 26. Then, at step 28, the software identifies whether the WLAN is on. If the WLAN is on, then the software calculates the flash current for the given lighting condition and measures the Vbat before the flash at step 30. If the WLAN pulse is on during the Vbat measurement (Step 32), the Vbat measurement is repeated until it is taken at a point where no WLAN pulse occurs. If Vbat is less than or equal to 3.67V, i.e., the equivalent of one bar on the battery meter on the main display section 21, then the flash process is terminated because the battery power is too low to sustain the flash without browning out or resetting the device. The next Vbat pre-flash measurement is made at step 34. If Vbat is greater than 3.67V, then the software performs a pre-flash reading ($V_{pre-flash}$). The battery droop (Vdrop) is then calculated from the measured voltage across the battery after the flash is initiated minus $V_{pre-flash}$ ($V_{drop}=VBAT-V_{pre-flash}$)

In the following calculations, the $Vdrop_{predicted}$ is the predicted voltage drop for a 500 ms pulse. Vdrop is the difference in voltage between an approximately 2 ms flash current pulse and the unloaded battery voltage VBAT. $ESR_{500}$ is determined using a lookup table (LUT) from the ESR that is calculated from the Vdrop measurements. The following table provides the conversion factor for a given flash output current to convert the output flash current to the input flash current.

| Flash Current (A) | Conversion Factor |
| --- | --- |
| 0.150 | 1.481 |
| 0.200 | 1.520 |
| 0.300 | 1.573 |
| 0.400 | 1.614 |
| 0.500 | 1.633 |
| 0.700 | 1.688 |
| 0.900 | 1.750 |
| 1.200 | 1.850 |

The additional nomenclature used in the following equations are defined below:

$I_{adj-flash}$ is the adjusted flash current after the second pre-flash reading at 4 ms from flash initiation.

$I_{New-flash}$ is the flash current determined by the first pre-flash reading.

$V_{2nd\text{-}flash}$ is the measured VBAT during the second pre-flash reading, i.e., approximately 4 ms after the first pre-flash reading.

$V_{cal\text{-}drop}$ is the calculated expected VBAT voltage during the second pre-flash reading.

ESR is the calculated equivalent series resistance of the battery.

$ESR_{500}$ is the calculated ESR for a 500 ms flash current pulse. The equation for determining this value is determined from the battery look up table for GSM (1 ms) pulses and Flash pulses (500 ms), though it should be appreciated that the length of the pulse will depend upon the communication regime employed.

$XXX\_ESR_{xx}$ is the GSM or Flash ESR value at the indicated (xx). These tables are already contained in a number of handheld electronic devices software. $XXX\_ESR_{closest\text{-}10degrees}$ is the closest ESR value in the look up table but not less than the calculated ESR value at 10 degrees less.

If the WLAN is enabled as determined at step 28 and a WLAN pulse occurred during the pre-flash reading as determined by step 36 in FIG. 4, then the WLAN pulse current needs to be subtracted from the estimated flash current to calculate the ESR at Step 38, which can be determined from the following equation 1:

$$ESR = (v\text{drop}/(I_{flash}*X_{LUT} - 0.211A)) + 0.068 \tag{1}$$

The 0.211A takes into account the worst case received WLAN current pulse. If there is no WLAN current pulse during the pre-flash reading, then the equivalent series resistance is determined at Step 40 by equation 2 below:

$$ESR = (V\text{drop}/(I_{flash}*X_{LUT})) + 0.068 \tag{2}$$

If the WLAN is not enabled as determined at step 28, then the ESR is calculated at step 42-50 using equation 2 above. If the ESR, as calculated, is greater than the $GSM\_ESR_{-19}$ that is, if the calculated ESR is greater than the ESR at −19° C. for a GSM pulse, then the software has to extrapolate at Step 52 the result as follows:

$$ESR_{500} = \left[ \frac{FLASH\_ESR_{-19} - FLASH\_ESR_{-9}}{GSM\_ESR_{-19} - GSM\_ESR_{-9}} \right]. \tag{3}$$

$$[ESR - GSM\_ESR_{-19}] + FLASH\_ESR_{-19}$$

If ESR is less than GSM_ESR, that is, if the calculated ESR is less than the ESR at 51° C., in the presence of a GSM pulse, the calculated 500 ms ESR is then equal to the flash ESR at 51° C. since the slope is zero at this point on a number of the look up tables. Accordingly, under these circumstances:

$$ESR_{500} = FLASH\_ESR_{51} \tag{4}$$

Otherwise, the 500 ms ESR is interpreted from the battery lookup table by determining the GSM_ESR value closest to but less than the ESR calculated above and applying the following formula:

$$ESR_{500} = \left[ \frac{FLASH\_ESR_{closest-10degrees} - FLASH\_ESR_{closest}}{GSM\_ESR_{closest-10degrees} - GSM\_ESR_{closest}} \right]. \tag{5}$$

$$[ESR - GSM\_ESR_{closest}] + FLASH\_ESR_{closest}$$

The calculated battery droop at 500 ms then becomes:

$$V\text{drop}_{predicted} = VBAT - ESR_{500} \cdot [I_{flash} \cdot X_{LUT} + 0.356] \tag{6}$$

The optimal percent reduction in flash current obtained at Step 54 is then expressed as:

$$\% \text{ Reduction in } I_{flash} = \left[ \frac{V_{pre\text{-}flash} - 3.2}{VBAT_{pre\text{-}flash} - V\text{drop}_{predicted}} \right] - 1 \tag{7}$$

If the calculated percentage reduction is greater than 100%, then the software uses a figure of 100% reduction, which means the software uses the original flash current value. If the percentage reduction is calculated to be less than zero percent, then the percentage reduction in current is zero. The new flash current then becomes:

$$I_{New\text{-}flash} = (1 + \% \text{ reduction}) * I_{flash} * X_{LUT} \tag{8}$$

The % reduction in equation (8) is a negative number. The second pre-flash reading ($V_{2nd\text{-}flash}$) corrects the flash current for any errors.

If a WLAN pulse occurred during the second pre-flash reading, then the WLAN transmit current needs to be added to the estimated battery droop as follows:

$$V_{cal\text{-}drop} = VBAT - ESR * (I_{New\text{-}flash} * X_{LUT} + 0.356A) * 1.03 \tag{9}$$

If a WLAN pulse did not occur during the second pre-flash reading, then the estimated battery droop is expressed as:

$$V_{cal\text{-}drop} = VBAT - ESR * (I_{New\text{-}flash} * X_{LUT}) * 1.03 \tag{10}$$

The new flash current, which was adjusted for errors, can then be expressed as:

$$I_{adj\text{-}flash} = I_{New\text{-}flash} * (V_{2nd\text{-}flash}/V_{cal\text{-}drop}) * 0.955 \tag{11}$$

It is important to note that the duration for the first pre-flash reading and the adjustment of the flash current must occur less than 3 ms after the camera process is initiated. If the time is longer, then there is a significant chance that the device will lock up when a flash is initiated.

Figure 5:
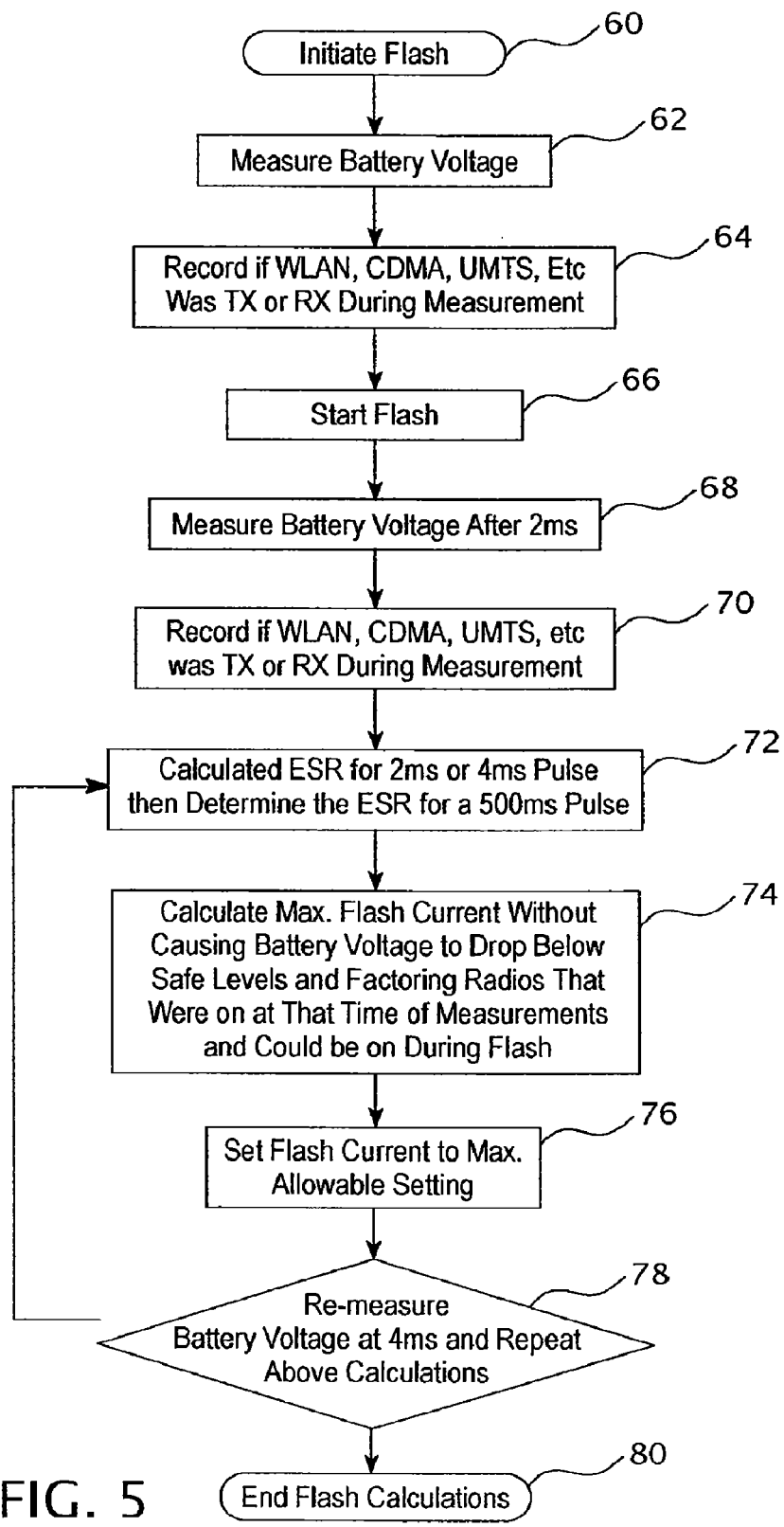
FIG. 5 is a logic flow diagram illustrating the further improved steps of this method.

A further improvement to the foregoing algorithm is shown in the flow chart illustrated in FIG. 5. In the improved algorithm the calculations are simplified and one or more of the relatively high current loads for which a worst case was assumed in the foregoing calculations and measurements, can be accounted for. In accordance with the algorithm illustrated in FIG. 5, a flash command is first initiated at step 60. Before the flash is actually initiated the battery voltage ($V_{b1}$) is measured at step 62 and a record is made of whether a high current load ($I_{highload1}$) occurred during the measurement at step 64. As is depicted in FIG. 6, such a record could be made by the microprocessor 5 and stored in a memory 1012 on the microprocessor 5. Alternatively, such a record could be made by a recording device 1016 that would be a separate component under the control of the microprocessor 5. If a high current load did occur it was recorded. High current loads can be caused by transmitting or receiving a radio signal, e.g., CDMA, WiFi, WLAN, UMTS, etc. The flash is actually initiated at step 66 and the battery voltage ($V_{b2}$) is again measured after 2 ms from the start of the flash at step 68. A record is made of any high current load ($I_{highload2}$) that occurred during the measurement at step 70. Again, such a record could be made by the microprocessor 5 and stored in the memory 1012 on the microprocessor 5. Alternatively, such a record could be made by the recording device 1016 or by another recording device 1016A under the control of the microprocessor 5. The recording devices 1016 and 1016A can be two individual components or can be a single component that performs multiple functions, without limitation. The ESR at 2 ms is then calculated at step 72 from the following formula:

$$ESR_{2ms} = \left[\frac{V_{b1} - V_{b2}}{I_{flash} + \sum I_{highload1} - \sum I_{highload2}}\right] \quad (12)$$

Where $\sum I_{highload1}$ is the sum of the high current loads that occurred during the respective voltage measurements. From the calculated ESR at 2 ms, the battery ESR at 500 ms is calculated in the same manner as was done above for the algorithm of the parent application. Then at step 74 the maximum current allowed from the battery (excluding high current loads) without adversely affecting the system ($I_{MAX}$) is calculated subtracting any high current loads that can occur during the flash using the following formula:

$$I_{Max} = \left[\frac{V_{b1} - V_{Min}}{ESR_{500ms}}\right] - \sum I_{highcurrent} \quad (13)$$

In step 76 the flash current is set to $I_{Max}$ and then the process is repeated at 4 ms into the flash starting at step 68 where the battery voltage is re-measured. The process may continuously repeat itself until the end of the flash cycle at step 80.

Thus this further improvement provides a simpler and more accurate calculation for the maximum flash current that could be sustained without dimming or resetting the device. The calculation is more accurate because more of the actual load is taken into account.

While specific embodiments have been described in detail, it will be appreciated by those skilled in the art that various modifications and alternatives to those details could be developed in light of the overall teachings of the disclosure. For example, this concept can be applied to other flash technologies other than just an LED; e.g., an organic light-emitting diode (OLED). Furthermore, while in the foregoing embodiments, the microprocessor 5 is programmed to perform many if not each and every one of the steps of this invention, it should also be appreciated that separate dedicated circuits or components, such as the components 1004, 1008, 1008A, 1016, and/or 1016A, for instance, may be employed to perform certain of the separate steps without departing from the intended scope of the following claims. Accordingly, the particular embodiments disclosed are meant to be illustrative only and not limiting as to the scope of the device and method described herein, which is to be given the full breadth of the appended claims and any and all equivalents thereof.

What is claimed is:

1. A method for adjusting a flash current of a flash in a handheld electronic portable device powered by a battery, the method comprising:
   determining any high current load from sources other than the flash during measurement of the voltage across the battery prior to initiation of the flash;
   determining any high current load from sources other than the flash during measurement of the voltage across the battery after initiation of the flash;
   determining a maximum current based on an equivalent series resistance (ESR) value for a predetermined flash current pulse duration, the equivalent series resistance (ESR) value determined as a function of an ESR of the battery after initiation of the flash, any high current loads that occurred during measurement of the voltage across the battery prior to initiation of the flash, any high current loads that occurred during measurement of the voltage across the battery after initiation of the flash, and potential high current loads due to variable loads placed on the battery; and
   adjusting the flash current to approximate the maximum current to maintain a maximum sustainable flash current over the predetermined flash current pulse duration.

2. The method of claim 1 wherein measurement of the voltage across the battery after initiation of the flash at an initial flash current occurs approximately 2 ms after initiation of the flash.

3. The method of claim 1 further comprising determining the maximum current at periodic intervals and re-adjusting the flash current after each periodic interval.

4. The method of claim 3, wherein each periodic interval is 2 ms.

5. The method of claim 1 further comprising determining the maximum current throughout the duration of the flash current pulse and re-adjusting the flash current throughout the duration of the flash current pulse.

6. The method of claim 1 wherein the potential high current loads include operating loads on the device.

7. The method of claim 6 wherein the operating loads include a WiFi TX/RX load.

8. The method of claim 1 wherein the initial flash current is approximately 500 mA.

9. The method of claim 1 wherein the flash current is adjusted within 3 ms of initiating the flash.

10. The method of claim 1 wherein the equivalent series resistance (ESR) value for the predetermined flash current pulse duration is determined based on known ESR characteristics for the battery.

11. A handheld portable electronic device powered by a battery, the device comprising:
   a flash device;
   a programmable current drive to initiate the flash device at an initial flash current;
   at least one voltage measuring device for measuring, prior to initiating the flash, the voltage across the battery, under normal system load, and for measuring the voltage across the battery with flash after the flash device is initiated;
   at least one recording device for recording any high current load from sources other than the flash during measurement of the voltage across the battery prior to initiation of the flash and for recording any high current load from sources other than the flash during measurement of the voltage across the battery after initiation of the flash; and
   a microprocessor configured to adjust the flash current of the flash device by:
      determining a maximum current that can be drawn from the battery based on an equivalent series resistance (ESR) value for the predetermined flash current pulse duration, the equivalent series resistance (ESR) value determined as a function of an ESR of the battery after initiation of the flash, any high current loads that occurred during measurement of the voltage across the battery prior to initiation of the flash, any high current loads that occurred during measurement of the voltage across the battery after initiation of the flash, and potential high current loads due to variable loads placed on the battery; and
      causing the programmable current drive to adjust the flash current to approximate the maximum current to maintain a maximum sustainable flash current over the predetermined flash current pulse duration.

12. The handheld portable device of claim 11 wherein the microprocessor is further configured to determine the maximum current at periodic intervals and cause the programmable current drive to re-adjust the flash current after each periodic interval.

13. The handheld portable device of claim 11 wherein the microprocessor is further configured to determine the maximum current throughout the duration of a flash current pulse and cause the programmable current drive to re-adjust the flash current throughout the duration of the flash current pulse.

14. The handheld portable device of claim 13 wherein the microprocessor is further configured to determine that a battery droop due to ESR follows a predicted path and does not reset the device.

15. The handheld portable device of claim 11 further comprising one or more radio frequency devices, and wherein the potential high current loads are due to operation of the one or more radio frequency devices.

16. The handheld portable device of claim 15 wherein the one or more radio frequency devices comprise WiFi TX/RX devices.

17. The handheld portable device of claim 11 wherein the flash device is a Light Emitting Diode (LED) flash device.

18. The handheld portable device of claim 11 wherein the flash device is an Organic Light Emitting Diode (OLED) flash device.

* * * * *